US009894113B2

(12) United States Patent
Bouvet

(10) Patent No.: US 9,894,113 B2
(45) Date of Patent: Feb. 13, 2018

(54) METHOD AND DEVICE FOR SUGGESTING APPLICATIONS

(71) Applicant: Orange, Paris (FR)

(72) Inventor: Bertrand Bouvet, Perros-Guirec (FR)

(73) Assignee: ORANGE, Paris (FR)

( * ) Notice: Subject to any disclaimer, the term of this patent is extended or adjusted under 35 U.S.C. 154(b) by 217 days.

(21) Appl. No.: 14/017,035

(22) Filed: Sep. 3, 2013

(65) Prior Publication Data

US 2014/0074931 A1  Mar. 13, 2014

(30) Foreign Application Priority Data

Sep. 7, 2012  (FR) ...................... 12 58387

(51) Int. Cl.
| | |
|---|---|
| *G06F 15/16* | (2006.01) |
| *H04L 29/06* | (2006.01) |
| *H04L 29/08* | (2006.01) |
| *H04M 1/725* | (2006.01) |
| *H04W 4/00* | (2009.01) |
| *H04L 29/12* | (2006.01) |
| *H04W 4/16* | (2009.01) |

(52) U.S. Cl.
CPC .......... *H04L 65/40* (2013.01); *H04L 61/1511* (2013.01); *H04L 61/304* (2013.01); *H04L 61/305* (2013.01); *H04L 61/307* (2013.01); *H04L 67/303* (2013.01); *H04L 67/34* (2013.01); *H04M 1/72525* (2013.01); *H04W 4/001* (2013.01); *H04W 4/003* (2013.01); H04L 61/157 (2013.01); H04L 61/605 (2013.01); H04L 67/22 (2013.01); H04M 2250/60 (2013.01); H04W 4/16 (2013.01)

(58) Field of Classification Search
CPC ..... H04L 65/40; H04L 61/1511; H04L 61/304
USPC .................................................. 709/203, 204
See application file for complete search history.

(56) References Cited

U.S. PATENT DOCUMENTS

| 2006/0048141 A1* | 3/2006 | Persson et al. ............... 717/176 |
| 2010/0088367 A1* | 4/2010 | Brown et al. ................ 709/203 |
| 2010/0088696 A1* | 4/2010 | Stoev et al. .................. 717/178 |
| 2010/0311468 A1* | 12/2010 | Shi et al. ...................... 455/558 |

(Continued)

OTHER PUBLICATIONS

Wikipedia—Telephone Number Mapping (revised Jul. 2011); http://en.wikipedia.org/w/index.php?title=Telephone_number_mapping &oldid=441886532 (retrieved Jun. 9, 2015).*

(Continued)

*Primary Examiner* — Philip B Tran
(74) *Attorney, Agent, or Firm* — Knobbe Martens Olson & Bear LLP

(57) ABSTRACT

A method for suggesting applications applied by a terminal compatible with its operating system, is disclosed. One aspect of the method includes receiving a link for accessing the downloading of the application and restoring a message suggesting to the user the downloading; The method further includes determining at least one data structure including identifiers; selecting at least one identifier; generating from the identifier a domain name including an indication of the operating system; and sending the domain name to a server capable of providing a corresponding link for accessing the domain name. Lastly, the access link is received in response to said sending step. A system and device for implementing the method are also disclosed.

13 Claims, 2 Drawing Sheets

(56) References Cited

U.S. PATENT DOCUMENTS

| | | |
|---|---|---|
| 2011/0022468 A1 | 1/2011 | Muster et al. |
| 2011/0307354 A1 | 12/2011 | Erman et al. |
| 2012/0047577 A1* | 2/2012 | Costinsky ..................... 726/22 |
| 2012/0208592 A1 | 8/2012 | Davis et al. |
| 2012/0265604 A1* | 10/2012 | Corner et al. ............. 705/14.39 |
| 2013/0225213 A1* | 8/2013 | Antypas, III ................ 455/466 |
| 2014/0019757 A1* | 1/2014 | Mehtala et al. ............. 713/168 |
| 2014/0129733 A1* | 5/2014 | Klais ........................... 709/239 |
| 2014/0344846 A1* | 11/2014 | Yamamura et al. ........... 725/25 |

OTHER PUBLICATIONS

International Search Report dated May 8, 2013 for French Application No. 1258387 filed Sep. 7, 2012.

\* cited by examiner

METHOD AND DEVICE FOR SUGGESTING APPLICATIONS

CROSS-REFERENCE TO RELATED APPLICATIONS

The present application claims priority to French Patent Application No. 1258387 filed on Sep. 7, 2012, the disclosure of which is incorporated herein by reference in its entirety.

BACKGROUND OF THE INVENTION

The present application relates to the distribution of applications on terminals (mobile phones, TV, domestic telephones . . . ), and in particular relates to the suggestion of applications.

Generally, the number of applications available on the market increases exponentially. Therefore, it is difficult for the user of a terminal to identify the applications which may suit him, a fortiori those compatible with his/her terminal.

Correlatively, when a company proposes a new application, it is desirable that it may inform the users having a compatible terminal on its availability.

SUMMARY OF THE INVENTION

Several embodiments of methods, systems, and devices are provided herein. In some embodiments, a remedy to the aforementioned drawbacks is provided.

For this purpose, some embodiments relate to a method for suggesting an application applied by a terminal, the application being compatible with the operating system of the terminal.

Some embodiments of the method include:
 determining at least one data structure which may include identifiers,
 selecting at least one identifier stored in memory in the data structure,
 generating from the selected identifier a domain name including at least one indication of the operating system of the terminal,
 sending the domain name to a server capable of providing a corresponding link for accessing the domain name,
 receiving a link for accessing the downloading of the application, in response to the sending step, and
 providing a message suggesting to the user of the terminal the downloading of the application by using this access link.

Correlatively, some embodiments relate to a device for suggesting an application which may be incorporated in a terminal, the application being compatible with the operating system of the terminal.

Some embodiments of the device comprise:
 a module for determining at least one data structure which may include identifiers,
 a module for selecting at least one identifier stored in memory in the data structure,
 a module for generating from the selected identifier, a domain name including at least one indication of the operating system of the terminal,
 a module for sending the domain name to a server capable of providing a corresponding link for accessing the domain name,
 a module for receiving a link for accessing the downloading of the application, in response to this sending,
 a module for providing a message suggesting to the user of the terminal the downloading of the application by using this access link.

Some embodiments also relate to a system for suggesting applications comprising a terminal including a suggestion device as mentioned above, and a server capable of associating an identifier with an application.

Some embodiments of the method may notably be applied upon starting the terminal and/or before/during/after each communication session.

By communication session, is meant in a non-limiting way any audio, video, image, web, instantaneous messaging, mail incoming or outgoing communication session.

Generally, the methods, systems and devices provided herein give the possibility of suggesting the downloading of an application compatible with the terminal of a user, this application being associated with an identifier present on the terminal, without the user having to accomplish an action for seeking an application.

Thus, in the case when there does not exist any application compatible with the terminal of the user, the latter is not exposed to advertising of an application which does not concern him.

The fact of using an identifier present on the terminal of the user gives the possibility of making sure that the user has already voluntarily interacted or will interact with this contact, resulting in a certain confidence level towards this contact.

The message of the restoration step may for example be a written message, a voice message, an image or a video.

The indication of the operating system of the terminal may for example be the type of operating system and its version.

Alternatively, the indication may include a brand of the terminal or the type of terminal or any other piece of information which may help in evaluating the compatibility of the application with the operation system of the terminal.

In a particular embodiment, the provision step further proposes to the user the selection of one of the following options: « download immediately», « download later on», « do not download», « disable the process». Further, the method comprises when the selected option is to « disable the process», a step for storing in memory the selected identifier in a memory, associated with the selected option by the user; the selection step consists of putting aside the identifiers associated, in the memory, with the option « download immediately», or with the option « do not download».

Thus, the user may either choose to download the suggested application and this when this is desired.

For example, if the user only wishes to download the suggested application when his/her terminal is connected to a certain telecommunications network, for example a Wi-Fi network, he/she may postpone the downloading as long as he/she is not connected to such a network.

In a particular embodiment, the structure of data is an address book of the terminal, a call log, a service log of audio-visual messaging, an instantaneous messaging log, a mail communications log, a directory of favorites, a web navigation history.

In a particular embodiment, the identifier is a telephone number, and the generation step is based on the Electronic NUMbering (ENUM) standard, the server being a DNS ENUM server.

In this embodiment, the suggestion device comprises an ENUM client capable of communicating with a DNS ENUM server.

The use of the ENUM standard gives the possibility of associating a telephone identifier with an application, and the use of a DNS ENUM server gives the possibility of covering all the applications associated with the telephone numbers of all countries, the ENUM standard providing internationalization of the telephone number before transforming it into a domain name.

Alternatively, the identifier may for example be an email address, an SIP address, a social network identifier, an instantaneous message identifier or a web URL.

For example, during the consultation of a web site by the terminal, the method may suggest the downloading of an application compatible with the terminal related to the URL of this web site, if such an application exists.

When the identifier is not a telephone number, the use of a server of the DNS type is also possible. In this case, for example, of an email address, the user portion of the address may become a sub-domain. Thus, for the email address user@orange.com, the domain name may be of the user.orange.com.OS.invention.fr type.

In a particular embodiment, the method comprises a step for downloading the application suggested in the provision step and a step for automatically starting this application during a communication session established with the contact identified by this identifier.

The user does not have to voluntarily start the downloaded application when he/she contacts the contact, the identifier which is associated with this application.

This particular embodiment provides the possibility, by repeating the example of the web site above, of automatically starting the mobile application downloaded beforehand as soon as the user consults the aforementioned web site from his/her mobile terminal.

In a particular embodiment, the method comprises a step for automatically closing said application upon closing the communication session.

Also, the user does not have to close the application after having completed the communication session with the contact, the identifier which is associated with this application.

In this way, the battery of the terminal is optimized since the application is not maintained unnecessarily open as a background task after the end of the communication session.

In a particular embodiment, the application assumes control of the communication session.

This control takeover may for example be accomplished upon establishing the session, or upon its holding, or its renegotiation. This control takeover may also for example consist of suspending the communication session, or of freeing it.

In a particular embodiment, the steps of the aforementioned method are determined by the instructions of a computer program.

Accordingly, some embodiments are also directed to a computer program including instructions for applying the steps of the method as described above, when the program is executed by a processor.

This method may use any programming language, both in the form of a source code and object code or intermediate code, in a partly compiled form or in any other form which may be interpreted by a computer.

Some embodiments are also directed to an information medium which may be read by a computer and including the instructions of a computer program as mentioned above.

This information medium may be any entity or device capable of storing the program. For example, the medium may be a storage means such as a ROM memory, a CDROM or a microelectronic circuit ROM or further a magnetic recording means for example a diskette (floppy disk) or a hard disk.

On the other hand, the information medium may be a transmissible medium such as an electric or optical signal which may be forwarded via an electric or optical cable, by radio or by other means. The program may in particular be downloaded on an Internet tool.

Alternatively, the information medium may be an integrated circuit into which the computer program may be incorporated, the circuit being adapted for executing the relevant process or for being used in the execution thereof.

BRIEF DESCRIPTION OF THE DRAWINGS

Other features and advantages of the methods, systems and devices described herein will become apparent from the description made below, with reference to the appended drawings which illustrate an exemplary embodiment thereof without any limitation. In the figures.

DETAILED DESCRIPTION OF PREFERRED EMBODIMENTS

Figure 1:
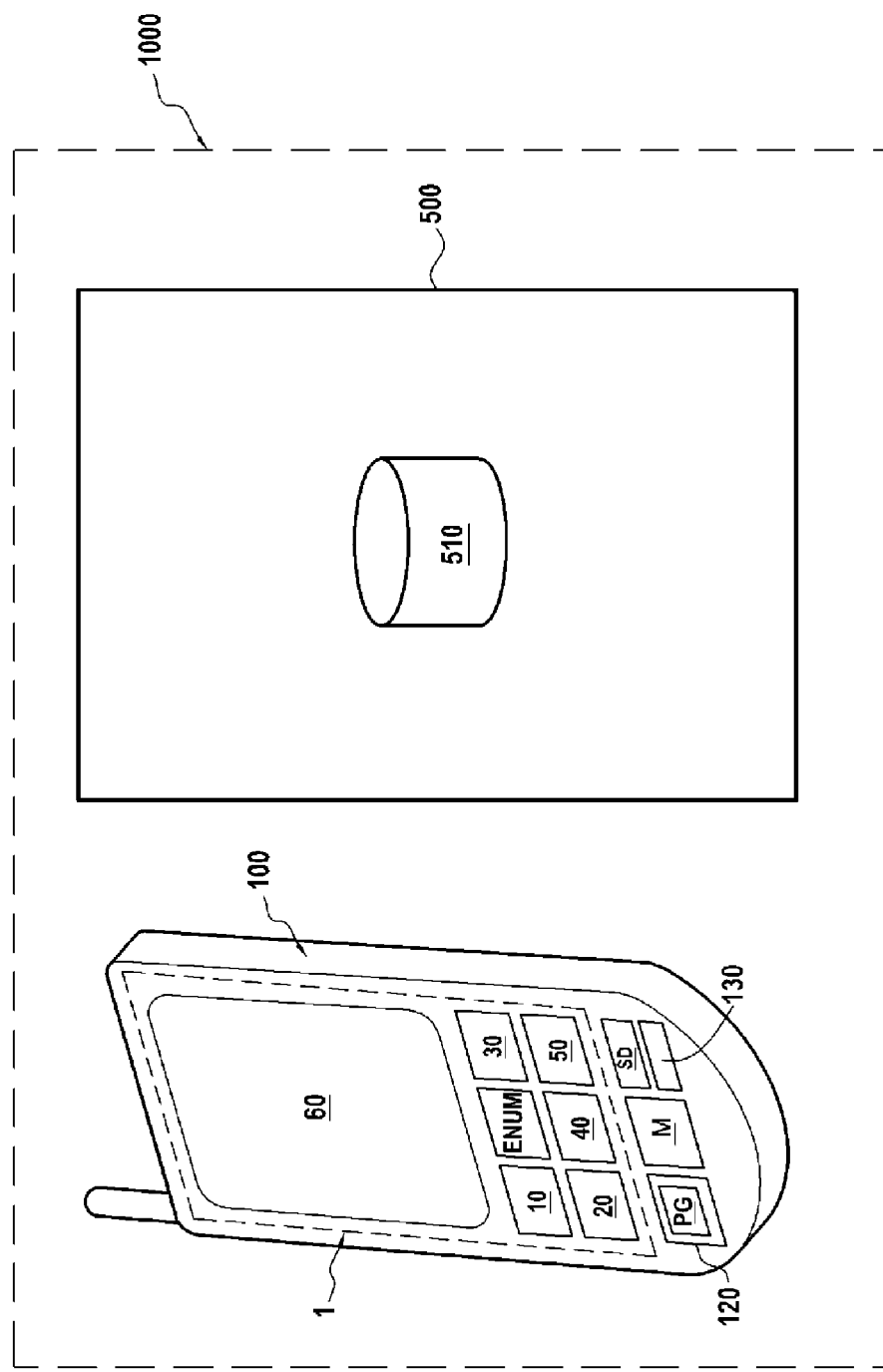
FIG. 1 schematically illustrates an exemplary system for suggesting applications.

FIG. 1 illustrates a system 1000 according to an exemplary embodiment.

The system 1000 comprises a terminal 100 (for example, a smart phone) notably including a suggestion device 1 as described herein, and a server computer 500.

In the exemplary embodiment described here, the terminal 100 has the hardware architecture of a mobile telephone. It notably includes a processor 130 and a memory such as a ROM 120. This ROM 120 forms a medium as described herein, the execution of which applies the step of the flow chart of FIG. 2.

The terminal 100 further includes a data structure SD including identifiers, as well as a memory M in which some of these identifiers are stored in memory, associated for each identifier with a piece of information indicating whether the downloading of an application has been completed (option « download now»), postponed (option « download later on») or cancelled (option « do not download»).

The suggestion device 1 on-board the terminal 100 includes a module 10 for determining a data structure SD in order to select therefrom an identifier which the user has not already refused to associate with an application and not already having an associated application on the terminal. For this purpose, the suggestion device 1 includes a selection module 20 operating, in this example, in cooperation with the memory M. In practice, the selection module 20 checks by reading in the memory M that the identifier is not associated with the option « download now» or with the option « do not download».

The suggestion device 1 further includes a module 30 for generating a domain name which is then sent to the server 500 by means of a sending module 40 of the suggestion device 1.

In this example, the suggestion device 1 loads an ENUM client and the exchanges between the server 500 and the terminal are compliant with the ENUM standard.

In a known way, the ENUM standard gives the possibility of associating a telephone identifier with an application. In particular, this standard allows transformation of a telephone number into an international telephone number (adding the prefix 33 for France), and then of transforming the latter into a domain name by starting with the end of the telephone number. A suffix consisting of indications (noted as OS) on the operating system is then added. Thus, the use of the ENUM standard and the addition of the suffix allows a domain name to be obtained.

In this example, the server 500 is a DNS ENUM server. It notably includes a database 510 in which identifiers, in this example telephone identifiers, are listed, associated with links for accessing the downloading of applications. In particular, when several access links exist for a same identifier, this means that the application exists for different operating systems.

Thus, when the DNS ENUM server receives the domain name from the sending module 40 of the suggestion device, it extracts the telephone identifier therefrom and queries the database 510 in order to determine whether a compatible application is associated therewith.

When no application exists for this telephone identifier or when an application exists for this identifier, but it is not compatible with the operating system of the terminal, the DNS ENUM server 500 sends back an answer of the type «no such entry» to a reception module 50 and the suggestion does not occur.

On the contrary, when a compatible application is associated with the telephone identifier in the database 510, the DNS ENUM server 500 sends back the link for accessing the downloading of this application to the reception module 50 and a restoration module 60, in cooperation with a man/machine interface of the terminal 100, restores a message suggesting that the user download this application.

Figure 2:
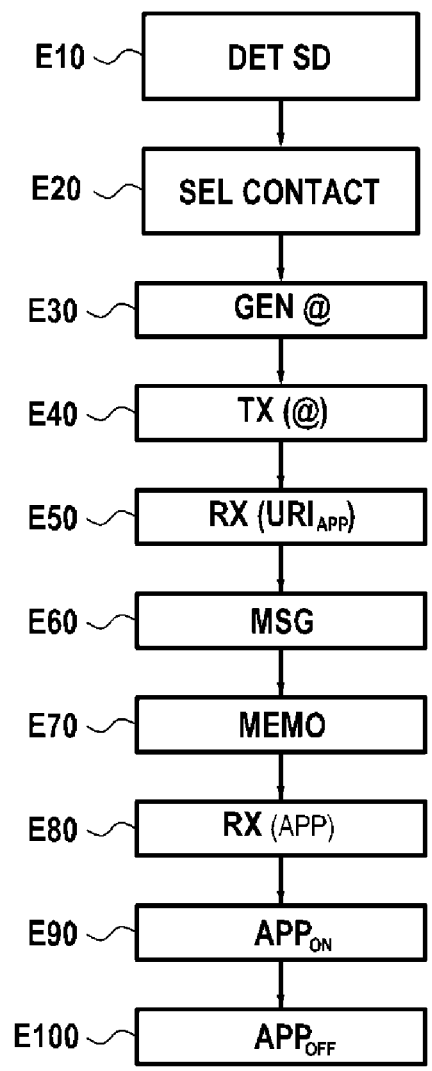
FIG. 2 illustrates as a flow chart, the main steps of a method for suggesting applications applied by the suggestion device of FIG. 1.

FIG. 2 illustrates as a flow chart, the main steps of a method for suggesting applications applied by the suggestion device 1 loaded on the terminal 100, already described with reference to FIG. 1.

The method as described below may be applied upon starting the terminal and/or before/during/after each communication session.

During a step E10, the suggestion device determines the data structures SD which may contain identifiers. In this example, the data structure SD is the call log of the terminal and contains two telephone numbers, i.e. 3900 and 3700.

The suggestion device checks whether the number 3900 is present in the memory M of the terminal. In this example, this is not the case, the number 3900 is therefore selected (step E20).

On the other hand, the number 3700 is present in the memory M and is associated therein with the option «do not download», therefore the number 3700 is not selected.

During a step E30, the suggestion device generates a domain name, from the number 3900 and from indications on the operating system of the terminal. In our example, the use of the ENUM standard and the addition of the corresponding suffix for the Android system version 2.2 for example leads the following domain name: 0.0.9.3.3.3.version22.android.invention.fr.

It will be noted in this example that two indications of the operating system of the terminal are used, i.e. the type of operating system (Android) and its version (2.2).

During step E40, the suggestion device sends this domain to a DNS ENUM server 500. In practice, the suggestion device formulates a DNS request, which would in our example be of the QUERTY NAPTR 0.0.9.3.3.3.version22.android.invention.fr type. In this example, there exists an application compatible for this telephone number.

The server 500 then returns a $URI_{APP}$ (for Uniform Resource Identifier) link for accessing the downloading of the corresponding application, this link being received by the suggestion device in step E50.

Following step E50, the suggestion device provides (step E60) a message to the user of the terminal via an adapted man/machine interface of the terminal. In our example, the message proposes four options to the user:
 «download immediately»;
 «download later on», in this case, the downloading is deferred to the next application of the method;
 «do not download», in this case the suggestion of applications for this identifier is disabled;
 «disable the method».

Generally, regardless of the option selected by the user, this selection is not irreversible. Indeed, there exists a mode in which the user may interact with this memory M via conventional configuration parameters of the terminal, for example in order to delete the contents of this memory or further change some options. Typically, when the user has disabled the method, he/she may enable it again later on.

In our example, the user selects, via the man/machine interface, the downloading of the suggested application. During step E70, the number 3900 associated with the selected option, i.e. download immediately, is stored in memory in the memory M and the downloading is carried out (step E80).

Thus, during a subsequent application of the method, during the selection step (E20), the number 3900 is put aside from the selection since the associated option in the memory M means that an application associated with this number has already been downloaded on the terminal.

Sometime later, the user tries to reach the number 3900. While the communication session is established, the application downloaded beforehand automatically opens ($App_{ON}$) in step E90.

In our example, the application assumes control of the communication session: the call is only established after the user has inputted some information in a form of the application, via the use of a callback function or in the callback mode.

Alternatively, the application may not have any impact on the communication session; it may simply be executed as a background task.

When the user hangs up, the application is ended automatically ($App_{OFF}$) during a step E100. Thus, regardless of the impact of the application on the communication session, its execution is finished and the application does not run indefinitely as a background task, thus avoiding discharge of the battery of the terminal, or further congestion in the random access memory.

Generally, the foregoing method may be applied in a call center context. In such a context, the different services proposed by an operator may be reached via a single short number, the qualification phase allowing the call to be routed towards the suitable service. The application of the method described earlier gives the possibility of limiting the waiting time of the caller by managing the caller qualification phase. Thus, client experience is considerably improved.

What is claimed is:
1. An automatic method for suggesting to a user of a terminal the download to the terminal of an application compatible with an operating system of the terminal, the method being performed by the terminal and comprising:
 determining, by the terminal, a data structure including identifiers;

selecting, by the terminal, an identifier from the data structure;

generating, by the terminal, from the selected identifier, a domain name including an indication of the operating system of the terminal;

sending, by the terminal, the domain name to a server configured to provide an access link corresponding to the domain name;

following the sending of the domain name by the terminal, the terminal receiving an access link for downloading the application, the access link being provided by the server; and providing, by the terminal, a message suggesting to the user of the terminal the download of the application to the terminal using the access link.

2. The automatic suggestion method according to claim 1, further comprising:

receiving for the selected identifier a user selection from the following options: «download immediately», «download later on», «do not download», and «disable the process»; and except when the user selection is to disable the process, storing the selected identifier together with the option selected by the user in a memory.

3. The automatic suggestion method according to claim 1, wherein the data structure is an address book of the terminal, a call log, a service log of audio-visual messaging, an instantaneous messaging log, a mail communications log, a directory of favorites, or a web navigation history.

4. The automatic suggestion method according to claim 1, further comprising:

downloading the application by the terminal; and the terminal automatically starting the application during a communication session established with a contact identified by the selected identifier.

5. The automatic suggestion method according to claim 4, further comprising the terminal automatically closing the application upon closing the communications session.

6. The automatic suggestion method according to claim 4, wherein the application assumes control of the communication session.

7. The automatic suggestion method according to claim 1, wherein the selected identifier is a telephone number and the server is a DNS Electronic NUMbering (ENUM) server, and wherein generating the domain name comprises generating the domain name based on the Electronic NUMbering ENUM standard.

8. A terminal having stored thereon instructions for executing an automatic method for suggesting to a user of the terminal the download to the terminal of an application compatible with an operating system of the terminal, wherein the automatic method is performed by the terminal when the instructions are executed by a processor, and wherein the automatic method comprises:

determining, by the terminal, a data structure including contact identifiers;

selecting, by the terminal, an identifier from the data structure;

generating, by the terminal, from the selected identifier, a domain name including an indication of the operating system of the terminal;

sending, by the terminal, the domain name to a server configured to provide an access link corresponding to the domain name;

following the sending of the domain name by the terminal, the terminal receiving an access link for downloading the application, the access link provided by the server; and providing, by the terminal, a message suggesting to the user of the terminal the download of the application to the terminal using the access link.

9. The terminal of claim 8, wherein the instructions are executed by a suggestion device for suggesting an application, wherein the suggestion device is incorporated into said terminal.

10. The terminal according to claim 9, wherein the suggestion device comprises an Electronic NUMbering (ENUM) client capable of communicating with a DNS ENUM server.

11. A non-transitory computer-readable medium on which is recorded instructions for executing an automatic method for suggesting to a user of a terminal the download of an application compatible with an operating system of the terminal, wherein the automatic method is performed by the terminal when the instructions are executed by a processor and wherein the automatic method comprises:

determining, by the terminal, a data structure including contact identifiers;

selecting, by the terminal, an identifier from the data structure;

generating, by the terminal, from the selected identifier, a domain name including an indication of the operating system of the terminal;

sending, by the terminal, the domain name to a server configured to provide an access link corresponding to the domain name;

following the sending of the domain name by the terminal, the terminal receiving an access link for downloading the application, the access link provided by the server; and providing, by the terminal, a message suggesting to the user of the terminal the download of the application to the terminal using the access link.

12. A system comprising:

the terminal of claim 8; and a server capable of associating an identifier with an application.

13. A non-transitory computer readable medium comprising instructions for suggesting to a user of a terminal the download to the terminal of an application compatible with an operating system of the terminal, wherein the instructions, when executed by a processor, perform an automatic method comprising:

determining, by the terminal, a data structure including contact identifiers;

selecting, by the terminal, an identifier from the data structure;

generating, by the terminal, from the selected identifier, a domain name including an indication of the operating system of the terminal;

sending, by the terminal, the domain name to a server configured to provide an access link corresponding to the domain name;

following the sending of the domain name by the terminal, the terminal receiving an access link for downloading the application, the access link provided by the server; and providing, by the terminal, a message suggesting to the user of the terminal the download of the application to the terminal using the access link.

* * * * *